(12) United States Patent
Ahn

(10) Patent No.: US 8,989,150 B2
(45) Date of Patent: Mar. 24, 2015

(54) APPARATUS AND METHOD FOR PERFORMING A HANDOFF IN A WIRELESS COMMUNICATION SYSTEM

(75) Inventor: Chi-Hun Ahn, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 1235 days.

(21) Appl. No.: 11/773,192

(22) Filed: Jul. 3, 2007

(65) Prior Publication Data

US 2008/0130583 A1 Jun. 5, 2008

(30) Foreign Application Priority Data

Jul. 3, 2006 (KR) .................. 10-2006-0061795

(51) Int. Cl.
| | | |
|---|---|---|
| *H04W 4/00* | (2009.01) | |
| *H04W 36/00* | (2009.01) | |
| *H04W 36/30* | (2009.01) | |
| *H04W 52/14* | (2009.01) | |
| *H04W 52/40* | (2009.01) | |

(52) U.S. Cl.
CPC ............ *H04W 36/30* (2013.01); *H04W 52/143* (2013.01); *H04W 52/40* (2013.01)
USPC ........................................ 370/332; 455/436

(58) Field of Classification Search
USPC ................. 455/453, 423, 429, 436–439, 442, 455/452.1, 513, 522, 115.3, 226.2, 571, 455/572; 370/331–333, 310.2, 328, 338; 709/225

See application file for complete search history.

(56) References Cited

U.S. PATENT DOCUMENTS

| | | | |
|---|---|---|---|
| 5,673,307 A | | 9/1997 | Holland et al. |
| 6,052,598 A | * | 4/2000 | Rudrapatna et al. ....... 455/456.1 |
| 6,487,191 B1 | | 11/2002 | Kang et al. |
| 2002/0094837 A1 | * | 7/2002 | Hamabe et al. ............... 455/522 |
| 2005/0208946 A1 | | 9/2005 | Kahana |

FOREIGN PATENT DOCUMENTS

| | | |
|---|---|---|
| EP | 1 094 680 | 4/2011 |
| GB | 2 358 109 | 7/2001 |
| KR | 1020000001838 | 1/2000 |
| KR | 1020030017205 | 3/2003 |

* cited by examiner

*Primary Examiner* — San Htun
(74) *Attorney, Agent, or Firm* — The Farrell Law Firm, P.C.

(57) ABSTRACT

Provided are an apparatus and a method for performing a handoff in a wireless communication system. The method includes executing a downlink fast power control when a Received Signal Strength (RSS) of a serving Base Station (BS) is less than a threshold; calculating a mean of RSSs subject to the downlink fast power control, and comparing the calculated mean with the threshold; and performing the handoff to a neighbor BS when the mean of the RSSs is less than the threshold.

4 Claims, 3 Drawing Sheets

APPARATUS AND METHOD FOR PERFORMING A HANDOFF IN A WIRELESS COMMUNICATION SYSTEM

PRIORITY

This application claims priority under 35 U.S.C. §119 to an application filed in the Korean Intellectual Property Office on Jul. 3, 2006 and assigned Serial No. 2006-61795, the contents of which are incorporated herein by reference.

BACKGROUND OF THE INVENTION

1. Field of the Invention

The present invention relates generally to an apparatus and method for performing a handoff in a wireless communication system, and in particular, to an apparatus and method for performing a handoff using a mean of Received Signal Strengths (RSSs) subject to a downlink fast power control, in a wireless communication system.

2. Description of the Related Art

Wireless communication system supports a handoff technology for continually maintaining a call connection in order to guarantee mobility of a terminal in service, when the terminal moves from a serving cell to another serving cell. In other words, handoff is performed to maintain communication when the terminal moves between the cells. There have been proposed two handoff methods: one is soft handoff and another is hard handoff.

The soft handoff performs the service using channels allocated by a handoff target (or neighbor) Base Station (BS) and a serving BS together. After that, it releases the channel from the serving BS when a channel quality of the serving BS drops below a predetermined threshold. Alternatively, the hard handoff releases the channel from the serving BS and allocates a channel from a neighbor BS, when the channel quality of the serving BS drops below a predetermined threshold during a communication.

FIG. 1 is a flowchart illustrating a conventional method for performing a handoff in a wireless communication system. For example, a description will be made below on the basis of a hard handoff.

Referring to FIG. 1, in Step 101 a controller of the wireless communication system checks whether it receives a signal from a neighbor BS in communication with a serving BS.

In Step 103, upon the receipt of a signal from the neighbor BS, the controller measures the Received Signal Strength (RSS) ($P_n$) of a neighbor BS and the RSS ($P_m$) of the serving BS.

In Step 105, the controller compares the RSS ($P_n$) of the neighbor BS and the RSS ($P_m$) of the serving BS with a preset threshold ($P_{th}$), to determine whether to perform the hard handoff. The controller returns to the Step 101, and checks whether it receives a signal from the neighbor BS, when the RSS ($P_n$) of the neighbor BS is less than the threshold ($P_{th}$) (i.e., $P_n < P_{th}$) or the RSS ($P_m$) of the serving BS is greater than or equal to the threshold ($P_{th}$) (i.e., $P_m \geq P_{th}$).

In Step 107, the controller performs the hard handoff to the neighbor BS. Next, the controller terminates the algorithm.

As described above, the hard handoff is performed in the wireless communication system, when the RSS of the serving BS is less than the threshold and the RSS of the neighbor BS is greater than or equal to the threshold. Thus, the hard handoff has a drawback that a ping-pong phenomenon occurs and call quality is deteriorated, when the RSS of the neighbor BS is greater than or equal to the threshold in a handoff area.

SUMMARY OF THE INVENTION

An aspect of the present invention is to substantially solve at least the above problems and/or disadvantages and to provide at least the advantages below. Accordingly, an aspect of the present invention is to provide an apparatus and method for performing a handoff, for reducing deterioration of call quality caused by a handoff in a wireless communication system.

Another aspect of the present invention is to provide an apparatus and method for performing a handoff using a downlink fast power control in a wireless communication system.

According to an aspect of the present invention, there is provided a method for performing a handoff in a wireless communication system. The method includes executing a downlink fast power control when a Received Signal Strength (RSS) of a serving BS is less than a threshold; calculating a mean of the RSSs subject to the downlink fast power control, and comparing the calculated mean with the threshold; and performing a handoff to a neighbor BS when the mean of the RSSs is less than the threshold.

According to another aspect of the present invention, there is provided an apparatus for performing a handoff in a wireless communication system. The apparatus includes a power controller for executing the downlink fast power control for the handoff when RSS of a serving BS is less than a threshold; and a handoff decider for calculating a mean of the RSSs subject to the downlink fast power control, and deciding whether to perform handoff.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE EXEMPLARY EMBODIMENTS

Exemplary embodiments of the present invention will be described herein below with reference to the accompanying drawings. In the following description, well-known functions or constructions are not described in detail since they would obscure the invention in unnecessary detail.

A technology for performing a handoff in a wireless communication system, using a Received Signal Strength (RSS) subject to a downlink fast power control according to an exemplary embodiment of the present invention will be described below.

Figure 1:
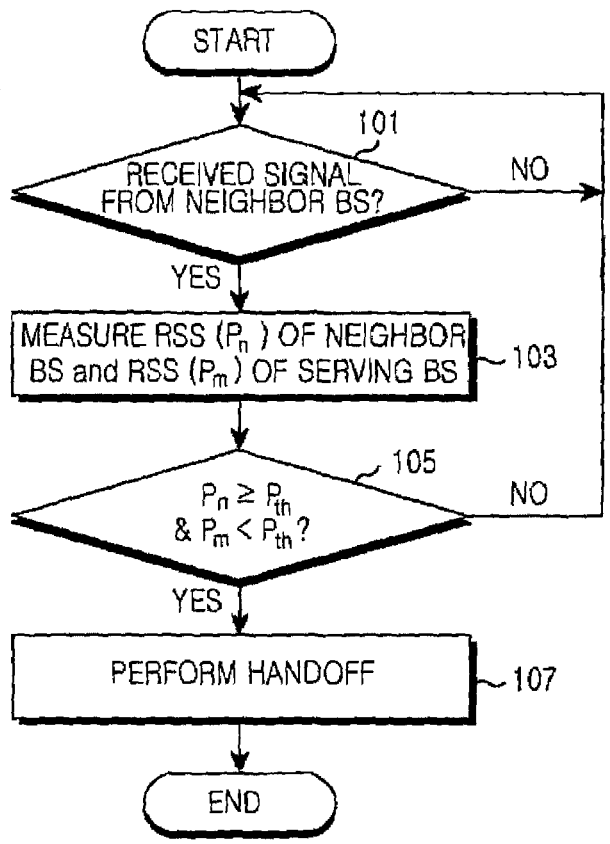
FIG. 1 is a flowchart illustrating a conventional method for performing a handoff in a wireless communication system.
Figure 2:
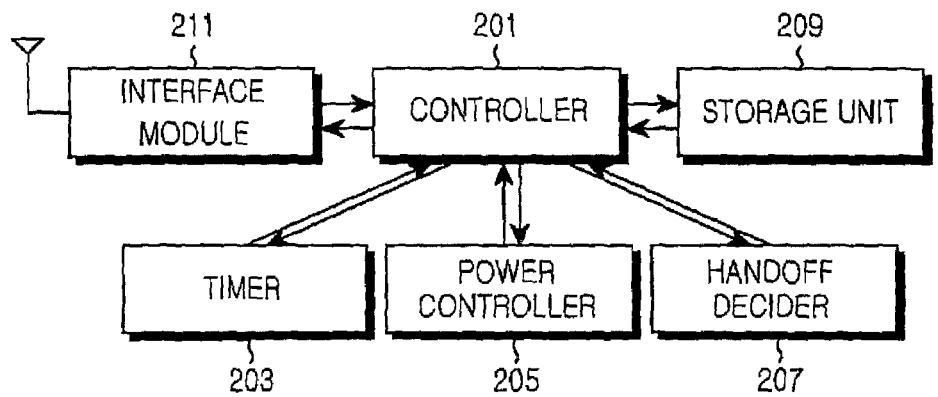
FIG. 2 is a block diagram illustrating a terminal for performing a handoff in a wireless communication system according to an exemplary embodiment of the present invention.

FIG. 2 is a block diagram illustrating a terminal for performing a handoff in a wireless communication system according to an exemplary embodiment of the present invention. In a description below, the terminal is meant to include all of a cellular phone, a Personal Communication Service (PCS), a Personal Digital Assistant (PDA), and International Mobile Telecommunication-2000 (IMT-2000). A description below will be made on the basis of architecture of the above examples.

Referring to FIG. 2, the terminal includes a controller 201, a timer 203, a power controller 205, a handoff decider 207, a storage unit 209, and an interface module 211.

The controller 201 controls a general operation of the terminal. For example, the controller 201 performs processing and control for voice communication and data communication. The controller 201 processes a function of controlling the handoff, using a mean of the Received Signal Strengths (RSSs) subject to the downlink fast power control for the handoff according to an exemplary embodiment of the present invention.

The timer 203 is enabled under the control of the controller 201, and provides an execution time for the downlink fast power control to determine whether the handoff is performed. For example, the controller 201 enables the timer 203 when receiving a timer enabling signal from the handoff decider 207. Thereafter, the controller 201 checks an expiration time of the timer 203, thereby checking the execution time for the downlink fast power control, because the timer 203 automatically expires when its preset period ends. The controller 201 controls the power controller 205 to execute the downlink fast power control until the timer 203 expires.

If the timer 203 is enabled, the power controller 205 executes the downlink fast power control for the handoff depending on the RSS. The power controller 205 executes the downlink fast power control till a time point when the timer 203 expires. For example, when the RSS is weak, the power controller 205 requests a serving Base Station (BS) to increase the RSS.

Upon the receipt of a signal from a neighbor BS, the handoff decider 207 measures RSS ($P_n$) of the neighbor BS and RSS ($P_m$) of the serving BS, and compares the measured RSSs with a preset threshold ($P_{th}$). Thereafter, the handoff decider 207 outputs the timer enabling signal to the controller 201, when the RSS ($P_m$) of the serving BS is less than the threshold ($P_{th}$) (i.e., $P_m < P_{th}$) and the RSS ($P_n$) of the neighbor BS is greater than or equal to the threshold ($P_{th}$) (that is, $P_n \geq P_{th}$).

If the timer 203 is enabled, the handoff decider 207 decides whether to perform the handoff using the mean of the RSSs subject to the downlink fast power control, until the timer 203 expires. The handoff decider 207 calculates the mean of the RSSs subject to the downlink fast power control, and decides to perform the handoff to the neighbor BS when the mean of the RSSs is less than the threshold. When the mean of the RSSs is greater than or equal to the threshold, the handoff decider 207 recognizes a channel state with the serving BS to be improved, and decides not to perform the handoff. This is assumes that the RSS of the neighbor BS is greater than or equal to the threshold.

The storage unit 209 stores program for controlling a general operation of a node, and temporary data generated in a program execution.

The interface module 211, a module for communicating with the BS, includes a Radio Frequency (RF) processor (not shown) and a baseband processor (not shown).

Figure 3:
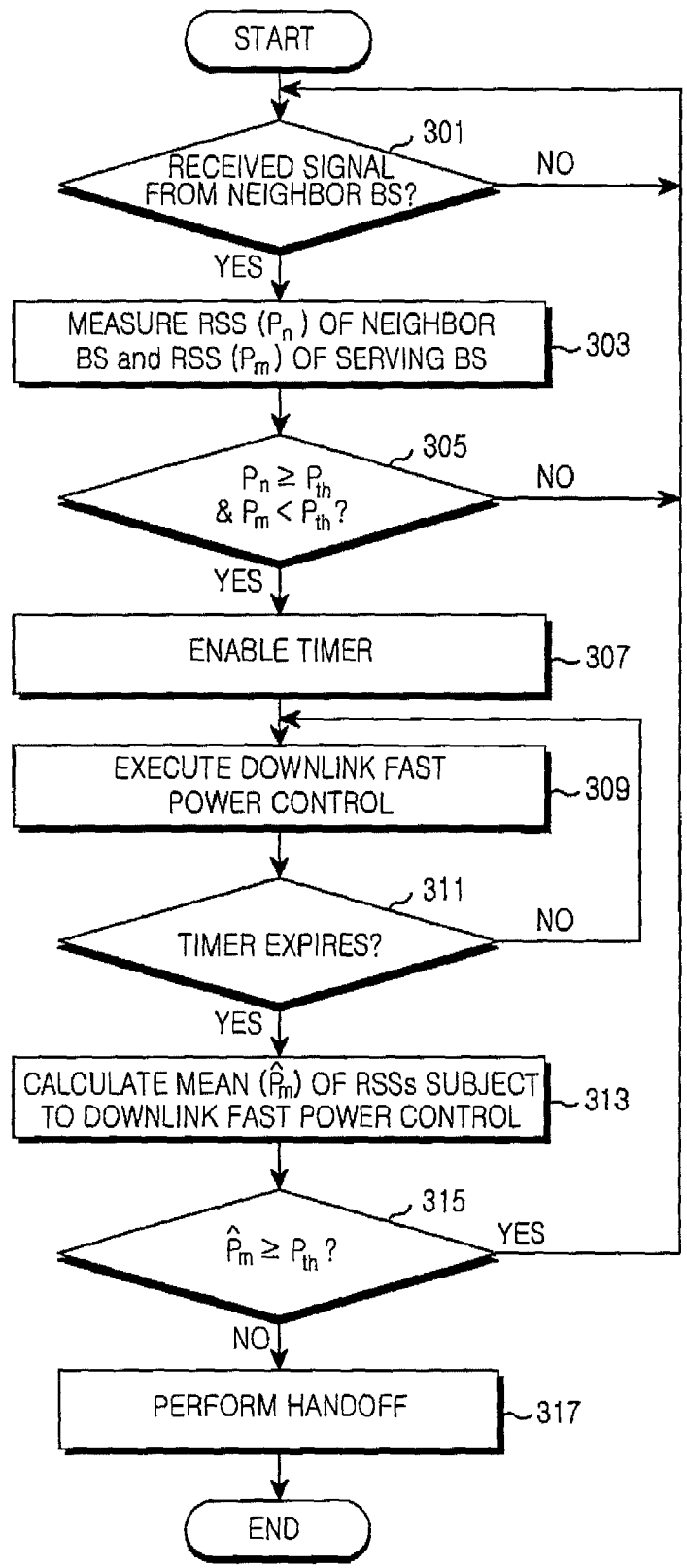
FIG. 3 is a flowchart illustrating a method for performing a handoff in a wireless communication system according to an exemplary embodiment of the present invention.

FIG. 3 is a flowchart illustrating a method for performing the handoff in the wireless communication system according to an exemplary embodiment of the present invention.

Referring to FIG. 3, the controller 201 checks whether it receives a signal from the neighbor BS in communication with the serving BS, in Step 301.

In Step 303, upon the receipt of the signal from the neighbor BS, the controller 201 measures the RSS ($P_n$) of the neighbor BS and the RSS ($P_m$) of the serving BS.

In Step 305, the controller 201 compares the RSS ($P_n$) of the neighbor BS and the RSS ($P_m$) of the serving BS with the preset threshold ($P_{th}$) to decide whether to perform the handoff. The controller 201 returns to the Step 301, and checks whether it receives a signal from the neighbor BS, when the RSS ($P_n$) of the neighbor BS is less than the threshold ($P_{th}$) (i.e., $P_n < P_{th}$) or the RSS ($P_m$) of the serving BS is greater than or equal to the threshold ($P_{th}$) (that is, $P_m \geq P_{th}$).

In Step 307, the controller 201 enables the timer 203 when the RSS ($P_n$) of the neighbor BS is greater than or equal to the threshold ($P_{th}$) (i.e., $P_n \geq P_{th}$) and the RSS ($P_m$) of the serving BS is less than the threshold ($P_{th}$) (that is, $P_m < P_{th}$). The timer 203 expires when the preset period ends.

In Step 309, the controller 201 executes the downlink fast power control for the handoff while enabling the timer 203. In Step 311, the controller 201 checks whether the timer 203 has expired.

If the timer 203 has not expired, the controller 201 returns to the Step 309, and keeps executing the downlink fast power control.

If the timer 203 has expired, the controller 201 calculates the mean ($\hat{P}_m$) of the RSSs subject to the downlink fast power control, while enabling the timer 203, in Step 313. The mean ($\hat{P}_m$) of the RSSs is calculated as set forth in Equation (1) below:

$$\hat{P}_m = \frac{P_1 + P_2 + \ldots + P_n}{n}, \tag{1}$$

where $\hat{P}_m$ represents a mean of the RSSs subject to a downlink fast power control, $P_n$ represents the RSS of $n_{th}$ signal received while the timer is enabled, and n represents a number of times of executing the downlink fast power control while the timer is enabled.

In Step 315, the controller 201 compares the mean ($\hat{P}_m$) of the RSSs with the threshold ($P_{th}$). The controller 201 determines the channel state with the serving BS to be improved, and does not perform the handoff, when the mean ($\hat{P}_m$) of the RSSs is greater than or equal to the threshold ($P_{th}$) (i.e., $\hat{P}_m \geq P_{th}$). Accordingly, the controller 201 returns to the Step 301, and checks whether it receives a signal from the neighbor BS.

In Step 317, the controller 201 performs the handoff to the neighbor BS, when the mean ($\hat{P}_m$) of the RSSs is less than the threshold ($P_{th}$) (i.e., $\hat{P}_m < P_{th}$). This assumes that the RSS of the neighbor BS is greater than or equal to the threshold. The RSS of the neighbor BS is a value measured after the timer 203 expires.

Thereafter, the controller 201 terminates the present algorithm.

In the above exemplary embodiment of the present invention, it is exemplified that hard handoff is performed using the mean of the RSSs subject to the downlink fast power control in the wireless communication system. In another exemplary embodiment of the present invention, a soft handoff can be performed in the same method using the mean of the RSSs subject to the downlink fast power control.

As described above, the present invention has an advantage that the handoff can be performed during a predetermined time in the wireless communication system, using the mean of the RSSs subject to the downlink fast power control, thereby reducing a ping-pong phenomenon and preventing deterioration of call quality in a handoff area.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for performing a handoff in a wireless communication system, the method comprising:
    when a Received Signal Strength (RSS) of a serving Base Station (BS) is less than a threshold and
    a Received Signal Strength (RSS) of a neighbor Base Station (neighbor BS) is greater than the threshold, executing, by a power controller, at least one or more times, downlink fast power control during a predetermined time;
    after expiration of the predetermined time, calculating a mean of RSSs of the serving BS;
    comparing the calculated mean of RSSs of the serving BS with the threshold; and
    when the mean of the RSSs of the serving BS is less than the threshold, performing the handoff to a neighbor Base Station (BS).

2. The method of claim 1, further comprising maintaining communication with the serving BS when the mean of the RSSs of the serving BS is greater than or equal to the threshold.

3. An apparatus for performing a handoff in a wireless communication system, the apparatus comprising:
    a power controller for executing, at least one or more times, downlink fast power control during a predetermined time,
    when a Received Signal Strength (RSS) of a serving Base Station (BS) is less than a threshold and a Received Signal Strength (RSS) of a neighbor Base Station (neighbor BS) is greater than the threshold;
    a handoff decider for calculating a mean of RSSs of the serving BS for the predetermined time and deciding to perform the handoff to a neighbor BS when the mean of the RSSs of the serving BS for the predetermined time is less than the threshold; and
    a timer enabled when the downlink fast power control is executed, and expiring by a preset period.

4. The apparatus of claim 3, wherein the handoff decider maintains communication with the serving BS when the mean of RSSs of the serving BS is greater than or equal to the threshold.

* * * * *